April 14, 1970     J. C. BRAITHWAITE     3,505,832

FLEXIBLE COUPLINGS

Filed July 11, 1968     2 Sheets-Sheet 1

Inventor
John Cannon Braithwaite
By
Pennie, Edmonds, Morton, Taylor & Adams
Attorneys

# United States Patent Office 3,505,832
Patented Apr. 14, 1970

3,505,832
FLEXIBLE COUPLINGS
John Cannon Braithwaite, Lancashire, England,
  assignor to Vickers Limited, London, England,
  a British company
Filed July 11, 1968, Ser. No. 744,036
Claims priority, application Great Britain, July 17, 1967,
32,837/67
Int. Cl. F16d *3/68*
U.S. Cl. 64—14                                       5 Claims

ABSTRACT OF THE DISCLOSURE

A shaft coupling device comprising two coaxial members carrying interdigitated vanes on their facing surfaces, and resiliently distortable elements cooperating with the vanes to connect the members together axially and limit relative rotation thereof, the elements being formed of laminations of a first, resilient, material and a second less resilient material.

---

This invention relates to couplings, and in particular to flexible couplings for coupling shafts or the like together in a flexible manner.

According to the present invention there is provided a coupling device for flexibly coupling together a first shaft and a second shaft, the device consisting of first and second approximately coaxial members; the first member being adapted for connection to the first shaft, and the second member being adapted for connection to the second shaft; the first member having on its surface facing the second member vanes interspaced between similar vanes on the surface of the second member facing the first member; and there being resiliently distortable elements between the vanes on the first member and the vanes on the second member and cooperating with the vanes to connect the members together axially and limit relative rotation thereof; said resiliently distortable elements being formed of laminations of a first, resilient, material and a second material that is less resilient than said first material. In this construction the resilient distortable elements are fast with the vanes on one of said members and engage with the vanes on the other of said members so as to be able to move with respect to this other member to permit free limited rotation of said members relative to each other.

Figure 1:
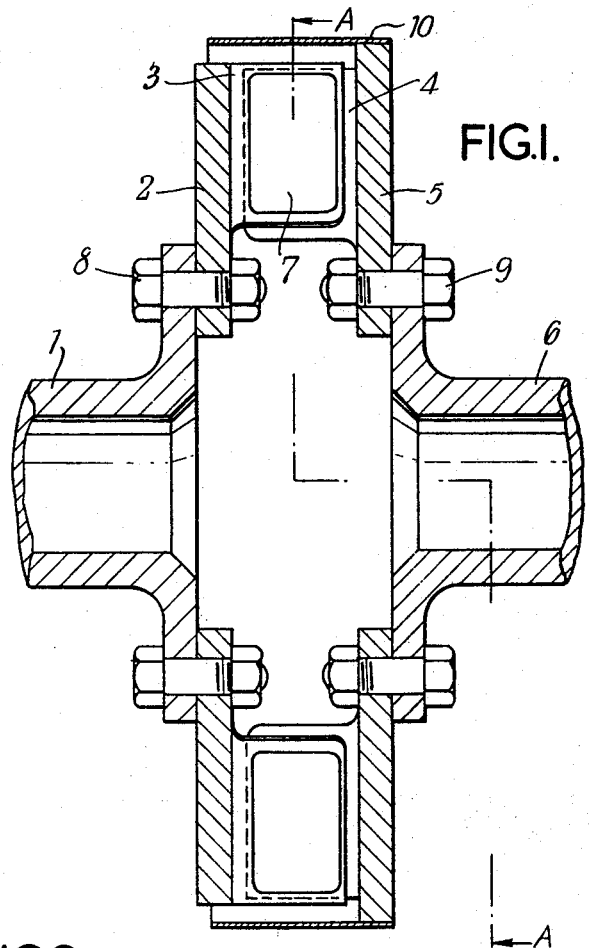
Figure 3:
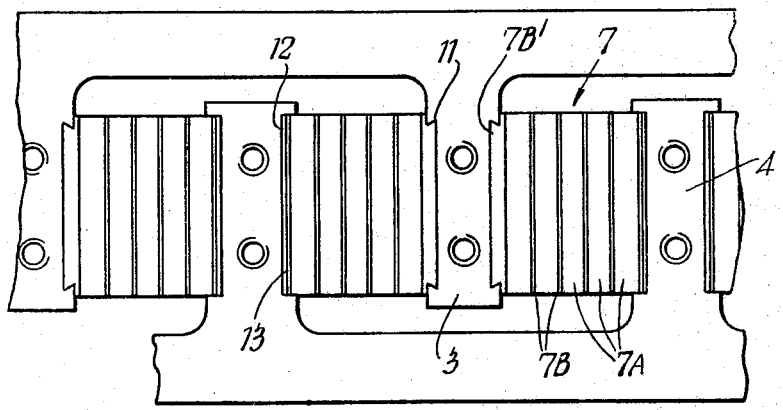
Figure 2:
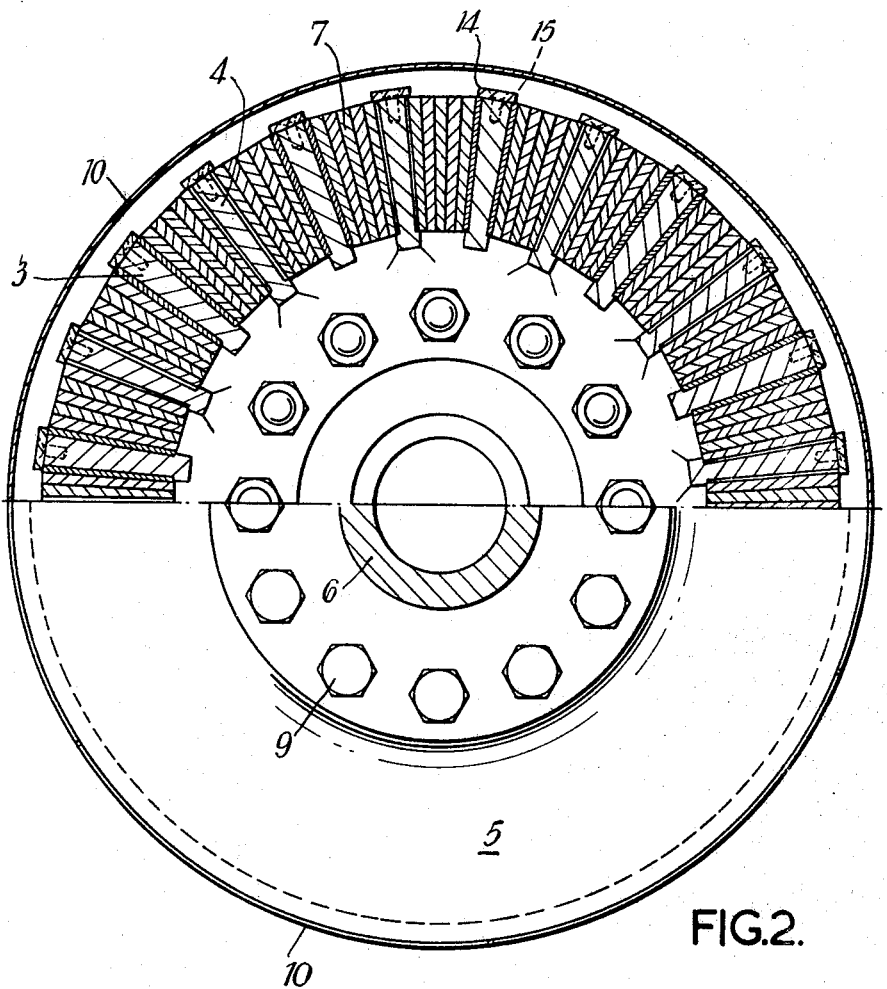

For a better understanding of the invention and to show how the same may be carried into effect reference will now be made, by way of eample, to the accompanying drawings, in which:

FIGURE 1 is a sectional side view of a flexible coupling coupling together a pair of shafts, FIGURE 2 is a front view of the coupling of FIGURE 1 taken along the line A—A of FIGURE 1 and partly in section, and FIGURE 3 is a developed plan view of part of the coupling of FIGURES 1 and 2, drawn to an enlarged scale and with a cover member and retaining plates removed.

Of the pair of shafts 1, 6 shown in the figures coupled together by the coupling, the shaft 1 has a flanged end secured to a first annular member 2 of the coupling near the inner rim of the member 2 by means of bolts 8. The annular member 2 is provided with a plurality of radial vanes 3 disposed uniformly around the face of the annular member 2 which is remote from shaft 1.

A second annular member 5 of the coupling is secured to a flanged end of the shaft 6, near the inner rim of the member 5, by means of bolts 9. The annular member 5 is provided with a plurality of radial vanes 4 disposed uniformly around the face of the annular member 5 which is remote from the shaft 6.

The arrangements of vanes 3 and 4 is such that each vane 3 projects into space defined between two adjoining vanes 4, whilst each vane 4 projects into a space defined between two adjoining vanes 3. The cover member 10, which is ringlike, is formed of discrete and separable portions, and is secured to the outer rim of the annular member 5 by bolts or screws (not shown).

Resiliently distortable elements 7 are disposed between each pair of adjacent and oppositely directed vanes 3 and 4. These resiliently distortable elements 7 comprise pads 7A of a resilient material, for example rubber, with a modulus of elasticity in the range of 100–10,000 lb./sq. in., interleaved with thin sheets 7B of a nonresilient material, for example steel, with a modulus of elasticity in the region of $30 \times 10^6$ lb./sq. in., the sheets 7B being bonded to the pads 7A. In all cases the material of the sheets 7B is less resilient than the material of the pads 7A. One face of each of the resilient distortable elements 7 is formed by a sheet 7B′ that is of dovetail form and that is engaged in a corresponding dovetailing 11 in the adjacent face of a vane 3 so that this one face of the element 7 is firmly fixed to this vane. Each element 7 is furthermore retained against centrifugal force by the retaining plates 14 held in position by screws 15. The vanes 4 each have a recess 12 on each face to act as a location for the nonfixed face 13 of each resiliently distortable element 7 so as to secure the annular members 2 and 5 together axially, the elements 7 being slidably engaged in the recesses 12 so as to be able to move with respect to the vanes 4 to permit free limited rotation of the annular members 2 and 5 relative to each other. It will be noted that in the form illustrated this nonfixed face 13 is formed by one of the sheets 7B. In stationary equilibrium each vane 3 or 4 is disposed equidistantly between the two opposite and adjoining vanes 4 or 3 respectively and the annular members 2 and 5 are approximately coaxial.

The replacement and fitting of the resiliently distortable elements 7 in separate sections of the coupling is greatly facilitated in view of the fact that the ringlike cover member 10 is formed of discrete and separable portions.

In use of the described coupling, the shafts 1 and 6 are firmly coupled to each other whilst they are still capable of limited relative motion with respect to each other to an extent determined by the limitation which the elements 7 place upon relative rotation of the members 2 and 5. Furthermore, it will be understood that the use of the resiliently distortable elements 7 results in a substantial damping of any vibrational component of such relative motion. In addition, when one of the shafts, for example, the shaft 1 is held in a supported position whilst the other shaft, the shaft 6, is not so supported, the shaft 6 will suffer a very slight static deflection, but when the shaft 1 transmits a torque to the shaft 6 and as the magnitude of this transmitted torque increases, this deflection is reduced. Thus, upon the transmission of such a torque the coupling is such as to provide a self-aligning action for the shaft 6.

Furthermore, the use of resiliently distortable elements composed of laminated resilient and nonresilient material and located only on opposite faces approximately parallel to the plane of the laminations, provides a coupling in which the torsional stiffness of the coupling increases only slightly with increasing torque. The resiliently distortable elements allow the transmission of an appreciable force in a direction normal to the plane of the laminations with only small compressive distortion of the elements. At the same time, the force required to cause shear deformation of the elements in the plane of the laminations thereof is relatively small. The coupling is such that there is sufficient space for each resiliently distortable element to deform within limits at right angles to the normal force applied.

Whilst in the form particularly described, one resiliently distortable laminated element 7 is disposed between adjoining and oppositely directed vanes 3 and 4, other numbers of elements may be provided. Furthermore, the resiliently distortable element or elements between each pair of adjoining vanes 3, 4 may be bonded to the vane to which the element is or the elements are firmly fixed.

I claim:

1. A coupling device for flexibly coupling together a first shaft and a second shaft, the device consisting of a first member adapted for connection to the first shaft; a second member adapted for connection to the second shaft, the first and second members being approximately coaxial; vanes on the surface of the first member that faces the second member; similar vanes on the surface of the second member that faces the first member, the vanes on the first member being interspaced between the vanes on the second member; and resiliently distortable elements between the vanes on the first member and the vanes on the second member and cooperating with the vanes to connect the members together axially and limit relative rotation thereof, said resiliently distortable elements being formed of laminations of a first, resilient, material and a second material that is less resilient than said first material, and being fast with the vanes on one of said members and engaged with the vanes on the other of said members so as to be able to move with respect to this other member to permit free limited rotation of said members relative to each other.

2. A coupling device according to claim 1, wherein each resilient element has a part of dovetail form, and wherein parts of the vanes of one of said members define corresponding dovetails in which the parts of dovetail form of the resilient elements are fast.

3. A coupling device according to claim 1, wherein that part of each resilient element that is fast with said one of said members is bonded to the vane with which this part of this resilient element cooperates.

4. A coupling device according to claim 1, wherein parts of the vanes of said other of said members define recesses in which said resilient elements are slidably engaged.

5. A coupling device according to claim 1, wherein said first, resilient, material is a material having a modulus of elasticity in the range of 100–10,000 lb./sq. in., and wherein said second material is a material having a modulus of elasticity in the region of $3.0 \times 10^6$ lb./sq. in.

References Cited

UNITED STATES PATENTS

| 2,122,838 | 7/1938 | Guy | 64—14 |
| 2,213,277 | 9/1940 | Guy | 64—14 |
| 2,301,659 | 11/1942 | Ricefield | 64—14 |

FOREIGN PATENTS

| 879,632 | 6/1953 | Germany. |
| 377,454 | 7/1932 | Great Britain. |

JAMES A. WONG, Primary Examiner

U.S. Cl. X.R.

64—27